(12) United States Patent
Berger et al.

(10) Patent No.: US 9,986,309 B2
(45) Date of Patent: May 29, 2018

(54) APPARATUS AND METHODS FOR PROVIDING INTERACTIVE EXTRAS

(71) Applicants: Sony Corporation, Tokyo (JP); Sony Pictures Entertainment Inc., Culver City, CA (US)

(72) Inventors: Richard Berger, Westlake Village, CA (US); Ellen Goodridge, Culver City, CA (US)

(73) Assignees: SONY CORPORATION, Tokyo (JP); SONY PICTURES ENTERTAINMENT INC., Culver City, CA (US)

(*) Notice: Subject to any disclaimer, the term of this patent is extended or adjusted under 35 U.S.C. 154(b) by 0 days. days.

(21) Appl. No.: 15/446,156

(22) Filed: Mar. 1, 2017

(65) Prior Publication Data

US 2017/0180828 A1 Jun. 22, 2017

Related U.S. Application Data

(63) Continuation of application No. 14/518,288, filed on Oct. 20, 2014, now Pat. No. 9,615,145.

(Continued)

(51) Int. Cl.
*H04N 21/8545* (2011.01)
*H04N 21/4722* (2011.01)
*H04N 21/443* (2011.01)
*H04N 21/8543* (2011.01)
*H04N 21/4788* (2011.01)

(Continued)

(52) U.S. Cl.
CPC ... *H04N 21/8545* (2013.01); *H04N 21/23439* (2013.01); *H04N 21/431* (2013.01); *H04N 21/4431* (2013.01); *H04N 21/4722* (2013.01); *H04N 21/4788* (2013.01); *H04N 21/8543* (2013.01)

(58) Field of Classification Search
CPC .......... H04N 21/4431; H04N 21/4722; H04N 21/4788; H04N 21/8543; H04N 21/8545
See application file for complete search history.

(56) References Cited

U.S. PATENT DOCUMENTS 7,451,460 B2 11/2008 Birnbum et al.
8,037,506 B2 10/2011 Cooper
(Continued)

*Primary Examiner* — Yassin Alata
(74) *Attorney, Agent, or Firm* — Mayer & Williams, PC

(57) ABSTRACT

Apparatus and methods are provided to implement a technique for providing supplemental information and interactive features for content, such as a movie. In one implementation, a content provider builds a package of information and interactive features ("interactive extras") using a defined structure and API (application programming interface). The content provider gives the package of extras to several distributors (or provides access to some or all of the package through a network resource). Each distributor uses the package in the distributor's content distribution platform or system by conforming to the API for the package. In this way, the content provider can provide the same package of extras to multiple distributors that may have incompatible platforms without having to build custom packages for each platform. This allows the content provider to build the package once and also provides a more consistent experience across the distributor services.

13 Claims, 13 Drawing Sheets

Related U.S. Application Data

(60) Provisional application No. 61/892,974, filed on Oct. 18, 2013.

(51) Int. Cl.
*H04N 21/2343* (2011.01)
*H04N 21/431* (2011.01)

(56) References Cited

U.S. PATENT DOCUMENTS

| | | |
|---|---|---|
| 2002/0099790 A1 | 7/2002 | Mosher |
| 2011/0072078 A1 | 3/2011 | Chai et al. |
| 2013/0047123 A1* | 2/2013 | May ..................... G06F 3/0482 715/834 |
| 2015/0100989 A1 | 4/2015 | Gellman |

\* cited by examiner

- create(videoDivId, contentId, res, contentType, playbackParams) //playbackParams [optional]: {disableFullScreen, startAtTime, endAtTime}
- removeCallback()
- play()
- pause()
- paused()
- stop()
- destroy()
- getCurrentTime()
- currentTime(milliseconds)
- duration()
- buffered()
- bufferedPercent()
- volume()
- volume(percentAsDecimal)
- width()
- width(pixels)
- height()
- height(pixels)
- size()
- size(width, height)
- requestFullScreen()
- cancelFullScreen()
- setWmode()
- enableStageVideo()
- controls(visibility)
- getError()

*FIG. 6*
*Exemplary player methods*

- Loadstart: Fired when the user agent begins looking for media data.
- Loadeddata: Fired when the player has downloaded data at the current playback position.
- Loadedalldata: Fired when the player has finished downloading the source data.
- Canplay:: Fired when the player has enough buffering to start playback.
- play: Fired whenever the media begins or resumes playback.
- pause: Fired whenever the media has been paused.
- timeupdate: Fired when the current playback position has changed. During playback this is fired every 15-250 milliseconds, depending on the playback technology in use.
- ended: Fired when the end of the media resource is reached.
- currentTime == durationprogress: Fired while the user agent is downloading media data.
- resize: Fired when the width and/or height of the video window changes.
- volumechange: Fired when the volume changes.
- error: Fired when there is an error in playback.
- fullscreenrequest: Fired when the player switches in or out of fullscreen mode.
- userscrubbing: Fired when the user starts scrubbing in playback.
- hidecontrolbar: Fired when the player controls disappear.
- showcontrolbar: Fired when the player controls appear.
- buffering: Fired when player is buffering.

*FIG. 7*
*Exemplary event methods*

Methods
- downloadFile(uri, progress_callback, completion_callback, error_callback)
- getFreespace()
- isFileDownloaded(uri)

Another alternative for the download (Currently implemented used by a specific retailer):
- createDownloadPlugin(contentId, divId,completion_callback)

Callbacks
- progress_callback(uri, percentage_done)
- completion_callback(uri, filesystem_path)
- error_callback(uri, error, message)

*FIG. 8*
*Exemplary file system methods and callbacks*

Methods (Optional)
- getScreenDimensions() //Player screen
- getWebviewDimensions()
- setWebviewDimensions(rect)
- setWebviewDimensions(rect, animated)

*FIG. 9*
*Exemplary UI methods*

Methods

- setOnConnectivityChanged(connectivity_changed_callback)
- isConnected()
- saveSetting(key, value, package, scope) {package: fully qualified package name, scope: local | server}
- loadSetting(key, package, scope) {package: fully qualified package name, scope: local | server}
- exitInteractiveExperience()
- saveState(state)
- loadState(state)

Callbacks

- connectivity_changed_callback(is_connected, interface) {interface: wwan | wifi}

Data

Possible settings:

| Key | Type | Description |
|---|---|---|
| • InteractivityClipAndShareEnabled or not (default: ON) | bool | A flag to identify whether C&S is enabled during playback |
| • InteractivityTriviaEnabled playback or not (default: OFF) | bool | A flag to identify whether Trivia is enabled during |
| • ShareToFacebook posted to Facebook (default: ON) | bool | A flag to identify if the user's social comments should be |
| • ShareToTwitter posted to Twitter (default: ON) | bool | A flag to identify if the user's social comments should be |

*FIG. 10*
*Exemplary interactive extras methods and callbacks, and possible data settings*

Methods

- purchase(title, purchase_callback,playback_callback) {title = (type: series|feature, sub_type: episode | bonus | memorable moment | trailer,root_id: main item identifier, sub_id: sub item identifier)}

- download(title) {title = (type: series|feature, sub_type: episode | bonus | memorable moment | trailer,root_id: main item identifier, sub_id: sub item identifier)}

- addToWishlist(title) {title = (type: series|feature, sub_type: episode | bonus | memorable moment | trailer,root_id: main item identifier, sub_id: sub item identifier)}

- removeFromWishlist(title) {title = (type: series|feature, sub_type: episode | bonus | memorable moment | trailer,root_id: main item identifier, sub_id: sub item identifier)}

- isInWishlist(title) {title = (type: series|feature, sub_type: episode | bonus | memorable moment | trailer,root_id: main item identifier, sub_id: sub item identifier)}

- loadWishlist()

- loadLocker()

- isPurchased(title) {title = (type: series|feature, sub_type: episode | bonus | memorable moment | trailer,root_id: main item identifier, sub_id: sub item identifier)}

- canPurchase(title) {title = (type: series|feature, sub_type: episode | bonus | memorable moment | trailer,root_id: main item identifier, sub_id: sub item identifier)}

- canDownload(title) {title = (type: series|feature, sub_type: episode | bonus | memorable moment | trailer,root_id: main item identifier, sub_id: sub item identifier)}

- isDownloaded(title) {title = (type: series|feature, sub_type: episode | bonus | memorable moment | trailer,root_id: main item identifier, sub_id: sub item identifier)}

Callbacks

- purchase_callback(status)
- playback_callback(status)

*FIG. 11
Exemplary entitlement methods and callbacks*

FIG. 12
*Exemplary social methods*

Methods

- loginFacebook()
- loginTwitter()
- isLoggedInFacebook()
- isLoggedInTwitter()
- facebookLike(title) {title = (type: series|feature, sub_type: episode | bonus | memorable moment | trailer,root_id: main item identifier, sub_id: sub item identifier)}
- facebookShare(title, comment) {title = (type: series|feature, sub_type: episode | bonus | memorable moment | trailer,root_id: main item identifier, sub_id: sub item identifier)}
- twitterTweet(message)

APPARATUS AND METHODS FOR PROVIDING INTERACTIVE EXTRAS

CROSS-REFERENCE TO RELATED APPLICATIONS

This application is a divisional of U.S. application Ser. No. 14/518,288, filed Oct. 20, 2014, which claims the benefit of priority of U.S. Provisional Patent Application Ser. No. 61/892,974, filed Oct. 18, 2013, entitled "Supplemental Content Information and Features", assigned to the assignee of the present application and herein incorporated by reference in its entirety.

FIELD

The invention relates to the field of content marketing, and in particular to systems and methods for providing extras in retailer and other media distribution channels.

BACKGROUND

Users have long been interested in obtaining additional information about their favorite movies. Consequently, the vast majority of physical discs containing entertainment content and titles, e.g., DVDs and Blu-ray® discs, contain such additional content, including trailers, bonus scenes, deleted scenes, director's commentaries, and the like. Additional content has even been incorporated such as games associated with the main item of content, and links to online resources pertaining to the content that viewers might also be interested in. Provision of such additional content on physical discs is by well known techniques, and employ on-screen menus which may be specialized to the content and which are generally familiar for viewers to follow.

Online distribution of movies, television, and other such entertainment content has likewise proliferated. In some conventional online distribution systems, a digital service provider just sells access to movies and TV shows, delivering a stream or download of the title with no interactivity. Some systems do allow for extras, but not interoperability or compatibility for the extras. For example, iTunes™ (Apple, Inc.) has a service called "iTunes Extras," but the same constitutes a custom format. A content provider can build a package of extras for iTunes extras, and can deliver the same to iTunes along with a movie, but the same is limited to the iTunes platform.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Apparatus and methods according to present principles extend the provision of additional information and content, e.g., "interactive extras", to online distribution systems, and in particular in a way that is applicable across multiple disparate distributor platforms. In particular, content providers can author an interactive extras experience once, and then have that "interactive extras package" be accessible to multiple retailers and their platforms. The content provider need not create different, proprietary interactive packages for each service provider that wants to have their own experience, and/or for each title having interactive extras. In this way, present principles allow the extension of providing extras to online distribution systems in a way that is modular and extensible.

In one implementation, a content provider builds a package of information and interactive features ("extras") using a defined structure and API (application programming interface). The content provider gives the package of extras to several distributors (or provides access to some or all of the package through a network resource). Each distributor uses the package in the distributor's content distribution platform or system by conforming to the API for the package. In this way, the content provider can provide the same package of extras to multiple distributors that may have incompatible platforms without having to build custom packages for each platform. This allows the content provider to build the package just once and also provides a more consistent experience across the distributor services.

In one implementation of the new system, a content provider, such as a movie studio, builds an enhanced playback experience that can be integrated or used with a digital service provider's native service and player using APIs (application programming interfaces). As multiple content providers adopt the structure and APIs, the format can help to standardize interactivity around movies and TV shows.

In another implementation, a content provider uses multiple extras packages together. For example, a content provider builds an extras package for a particular movie. The content provider also builds a secondary extras package, e.g., an extras package for a genre associated with the movie, for a set of movies associated with the director of the movie, and the like. Both extras packages are accessible through the distributor's platform. The genre package would also be available for other movies within the same genre. Similarly, the content provider can build extras packages for other features related to the movie, such as director, actor, series, subject matter, time period, etc. These secondary packages provide an additional layer of modularity, reusability, and customization (e.g., choosing different secondary packages automatically for different distributors or users, such as selecting trailer packages based on region or date). It can also be easier to update the content for an extras packages by updating related secondary packages (especially in a network environment). In one implementation, the extras packages use the same API (or an additional common API) to interact with one another. For example, the content provider gives a distributor access to the movie extras package but access to the secondary extras packages is provided through the movie extras package and is transparent to the distributor. In another variation, parts of a movie extras package can be replaced by parts of secondary package, such as scenes or dialogue or audio track.

In another implementation, a distributor accesses or provides additional extras that are not provided in the content provider's package. For example, a distributor may create its own extras package and/or may provide or access a third party extras package (e.g., from an advertiser). Similar to the secondary packages above, these packages can also operate beside or with one another and/or the content provider's package(s).

In one aspect, the invention is directed towards a server-based method for creating a data file constituting an interactive extras package, the data file configured such that interactive extras defined by the interactive extras package are accessible across multiple server platforms, the interactive extras pertaining to a main content item, a distribution format being defined for the interactive extras package, the distribution format defined by distribution format data, the distribution format data having been transmitted to at least one media sharing server constituting a server platform, including: on a server, creating an interactive extras package, the interactive extras package defining one or more interactive features pertaining to a main content item; on the server, adapting the interactive extras package to a distribution format, the distribution format defined by distribution format data, such that the interactive extras package is configured to be integrated into a media sharing application operated on a media sharing server; and transmitting the interactive extras package to at least one media sharing server operating the media sharing application, the media sharing server having previously received the distribution format data, the media sharing server having integrated a distribution format defined by the distribution format data into the media sharing application, such that the interactive extras may be displayed by the media sharing application without further modification.

Implementations of the invention may include one or more of the following. The distribution format may be defined by an API, and the format may be implemented in a hypertext markup language. The method may further include, on a server, creating a secondary interactive extras package, the secondary interactive extras package defining one or more secondary interactive features pertaining to a category; on the server, adapting the secondary interactive extras package to a distribution format, the distribution format defined by distribution format data, such that the secondary interactive extras package is configured to be integrated into a media sharing application operated on a media sharing server; on the server, associating one or more content items with the category; and transmitting the secondary interactive extras package to the at least one media sharing server, such that the secondary interactive extras may be displayed by the media sharing application without further modification. The secondary interactive extras package may be configured for interoperability with the interactive extras package, may be configured to provide an update to the interactive extras package, and/or may replace a portion of the interactive extras package.

In another aspect, the invention is directed towards a method for providing access to interactive extras pertaining to a content item, including: receiving a login request from a user computing environment to a media sharing application operating on a media sharing server; receiving authentication credentials at the media sharing server of a user from the user computing environment; upon successful authentication, allowing access to one or more content items according to a user account associated with the received authentication credentials, the allowing access including allowing access to a player component operated by the media sharing application for playback of the one or more content items; receiving a request from the user computing environment to access interactive extras pertaining to the one or more content items; providing partial control from the media sharing application to an interactive extras application, the partial control including control of at least the player component and control of an interactive extras feature; receiving a request to terminate access to the interactive extras; and receiving control at the media sharing application from the interactive extras application, including control over the player component.

Implementations of the invention may include one or more of the following. The providing partial control from the media sharing application to the interactive extras application may include providing a user interface to provide access to one or more features within the interactive extras application. The method may further include receiving distribution format data; and adapting the media sharing application to the distribution format data, such that the interactive extras may be incorporated within the media sharing application as ancillary content to the one or more content items without further modifying the media sharing application. The distribution format may include an API, and the adapting may include integrating the API into the media sharing application. The method may further include receiving a request from the user computing environment to access secondary interactive extras pertaining to a category of the one or more content items, and downloading or accessing a secondary interactive extras package pertaining to the category requested. The category may be a genre. The secondary interactive extras package may modify the interactive extras application. The interactive extras application may include a page having links to one or more interactive extras, and/or may be an application allowing access to a set of functions within an API. The method may further include updating the interactive extras application. The interactive extras application may include a tool to share information with other users through a network, as well as a tool to search information related to the one or more content items.

In yet another aspect, the invention is directed towards a method for providing supplemental movie information, including: creating information and an interactive application related to a movie; building an extras package including the information and the interactive application, where the package is built according to a common API; and providing access to the extras package to multiple distributor systems.

Implementations of the invention may include one or more of the following. The method may further include updating the information and updating the package. The providing access to the extras package may include storing the extras package on the server and allowing the distributor system to access the extras package through the server. The interactive feature may be a tool for sharing information with other users through a network, or a tool for searching information related to the movie.

In related aspects, the invention is directed towards non-transitory computer readable media, including instructions for causing computing environments to perform the above methods.

Advantages of the invention may include, in certain embodiments, one or more of the following. Interactive extras packages, e.g., with supplemental information and features, may be built using a common structure and interface. The apparatus and methods allow access of a common package by multiple platforms that are not generally compatible. Search capabilities and support may be built into the package. Social network and sharing features and support may be built into the package. Other advantages will be understood from the description that follows, including the figures and claims.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

FIG. 6 illustrates a portion of an API which may be employed in systems and methods according to present principles, and in particular a portion illustrating various player methods.

FIG. 7 illustrates a portion of an API which may be employed in systems and methods according to present principles, and in particular a portion illustrating various event methods.

FIG. 8 illustrates a portion of an API which may be employed in systems and methods according to present principles, and in particular a portion illustrating various file system methods and callbacks.

FIG. 9 illustrates a portion of an API which may be employed in systems and methods according to present principles, and in particular a portion illustrating various user interface methods.

FIG. 10 illustrates a portion of an API which may be employed in systems and methods according to present principles, and in particular a portion illustrating various interactive extras methods and callbacks, and possible data settings.

FIG. 11 illustrates a portion of an API which may be employed in systems and methods according to present principles, and in particular a portion illustrating various entitlement methods and callbacks.

FIG. 12 illustrates a portion of an API which may be employed in systems and methods according to present principles, and in particular a portion illustrating various social methods.

Like reference numerals refer to like elements throughout. Elements are not to scale unless otherwise noted.

DETAILED DESCRIPTION

Figure 1:
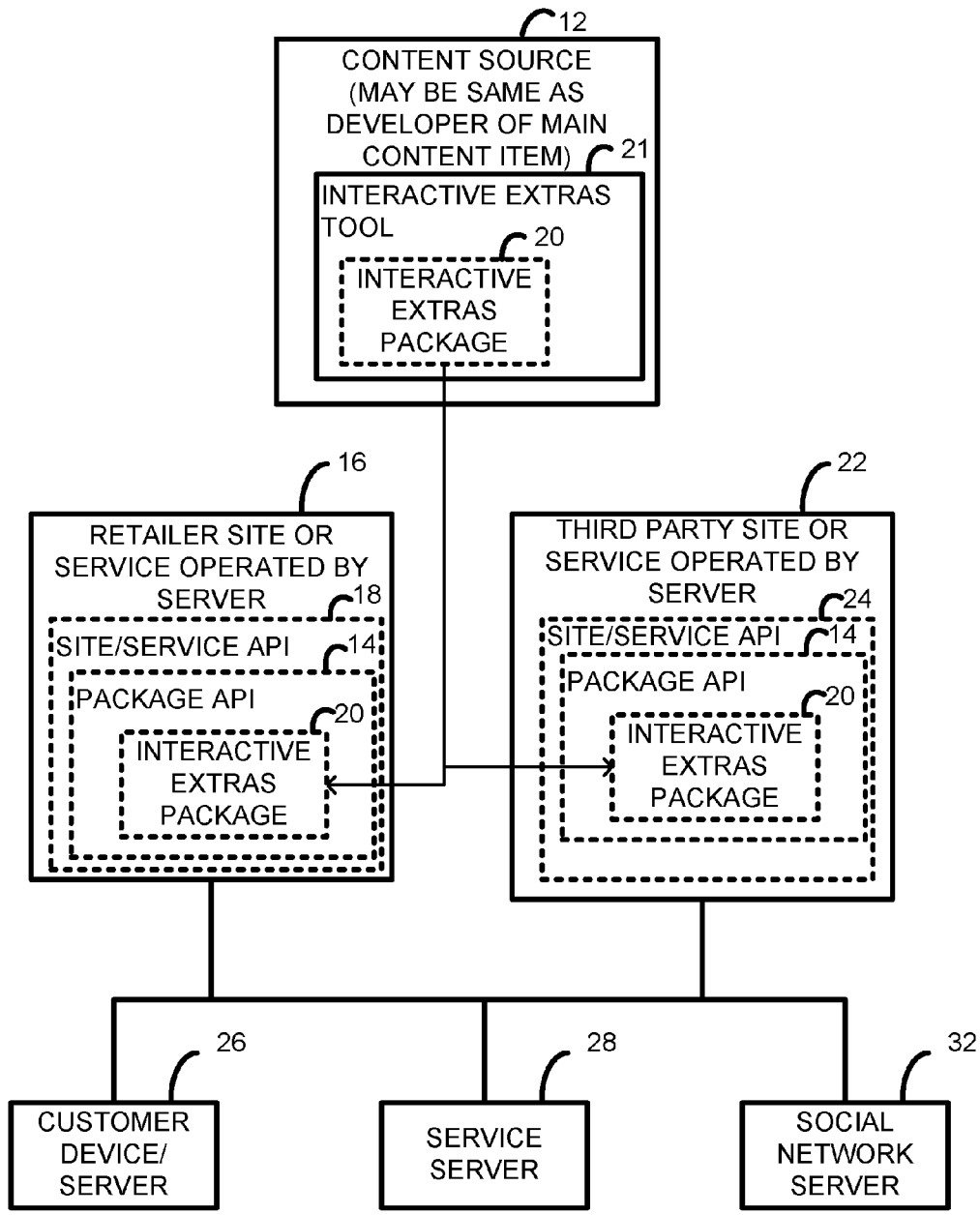
FIG. 1 illustrates a schematic diagram of a system for providing an interactive extras package according to present principles.

Referring to FIG. 1, present principles generally relate to a system 10 which includes various end-user devices including a customer device or server 26, a server 28 related to a service, e.g., a content provider service, as well as a server 32 associated with a social network. These devices may be employed to view or access content from a server 16 associated with a retailer site or service, and/or a server 22 associated with a third-party site or service. The servers 16 and 22 are termed herein media sharing servers, and the same are termed herein associated with media sharing sites or services.

The media sharing servers 16 and 22 access content from a content source 12. The access may be by way of an appropriate API as will be described, and/or via downloading content to servers 16 and 22. The content source 12 can receive content for distribution from various sources, including a content developer. For simplicity in this description, the content source 12 is considered to be the developer or provider of interactive extras which pertain to a main or premium content item or are otherwise associated with one or more such content items, e.g., pertain to a genre, actor, director, subject matter, or other such category. The content source 12 may take advantage of a distribution network, such as a content delivery network (CDN).

The content source 12 generally uses a tool 21 to create an interactive extras package 20. In so doing, the content source creates various supplemental information and interactive features which can be viewed in combination with the presentation of a main item of content. The interactive features and supplemental information may operate via an interactive extras application which can be, e.g., embodied by a page of content, e.g., in HTML 5, which includes links to and thus allows access to the various interactive extras. The extras may include search functionality, e.g., full dialogue search, searching within the cast, searching trivia, or the like. The interactive features and supplemental information may include bonus content, including trailers, deleted scenes, and previews. The interactive features and supplemental information may allow integration with one or more social networks, e.g., allowing users to make various posts about the main item of content e.g., can post links to their favorite scenes. The interactive features and supplemental information may include other sorts of interactivity, e.g., trivia quizzes, filmographies, "clip and share" functionality, e.g., where users can create and share their own favorite clips from a movie, or the like. Other such features, termed herein cumulatively as "interactive extras", will also be understood. Using such features, viewers may be provided with a broad set of interactive experiences greatly enhancing their viewing of a main or premium item of content, and often making the same significantly more immersive. Details of the provision of such interactive extras are discussed below.

To accomplish such features, the interactive extras package 20 may be distributed to media sharing servers such as servers 16 and 22. As will be discussed, the interactive extras package has a defined structure and format, e.g., an API 14, the API providing a set of functions through which user computing environments may access the interactive extras when navigating or otherwise operating media sharing sites. In so doing, the media sharing sites may perform a one-time integration of their sites to conform to the API 14 for the package, in some cases modifying a site or service API 18 or 34 associated with the media sharing site. However, the integration need only be performed once, and once it is performed, subsequent titles provided by the content source 12 may be automatically configured to provide the interactive extras functionality, without the need for any significant further modification of the servers 16 or 22. In some cases, an update may be provided to the format, e.g., the API, but the same will simply entail at most an additional integration step, and no per title step.

Figure 2:
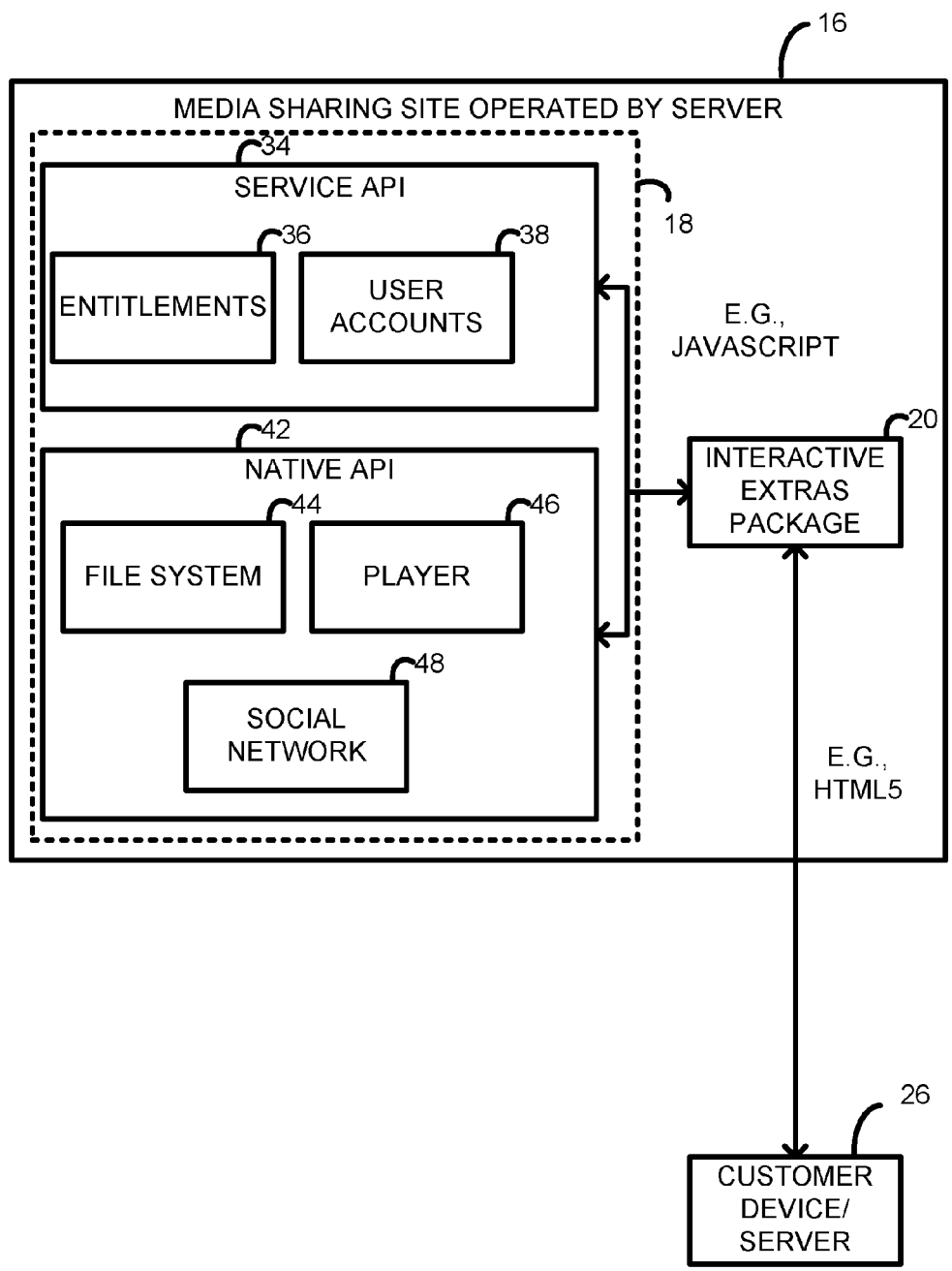
FIG. 2 is a diagram showing greater detail of the interaction between a customer device and an interactive extras package situated on a media sharing site and provided to the site by, e.g., a content source, provider, or developer, according to present principles.
Figure 4:
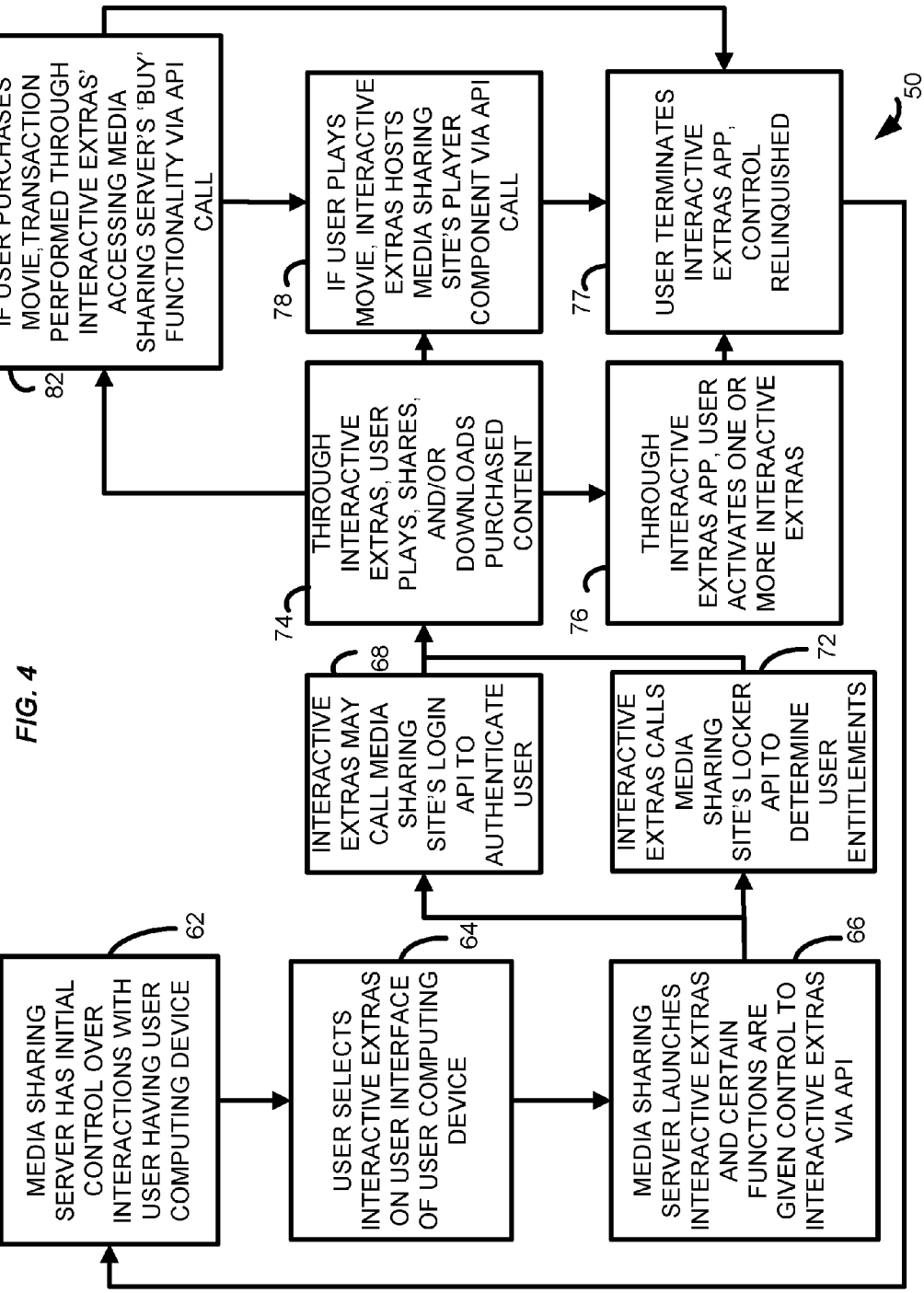
FIG. 4 is a flowchart illustrating a first method according to present principles.

Referring to the schematic diagram 30 of FIG. 2, additional details may be seen. In this diagram, a customer device 26 is accessing a media sharing site, and in particular a server 16. The customer device 26 is accessing content available from the server 16 though the interactive extras package 20, although in some implementations, the customer device 26 need not access content through the package 20. That is, the customer device 26 may access the same through a native UI associated with the media sharing site. In one implementation, as seen in the flowchart of FIG. 4, it will be seen that the mode of operation may switch from a mode only involving the native UI of the media sharing site to a mode involving the interactive extras package and back again.

Returning to FIG. 2, the interactive extras package may use certain functionality of the media sharing server, and in particular may require that certain APIs be provided and implemented by the same, e.g., using Javascript, and exemplary ones described are divided into a service API set 34 and a native set API 42. For example, the media sharing site and server may be required to facilitate launching the interactive extras, e.g., an interactive extras application associated with the same, that implements functionality provided in the interactive extras package. The application may simply be to allow access to the functionality, but can also be significantly more complex as well, implementing a complex UI along with other functionality. An API may be required for user login, accessing user account functionality 38, as well as provided functionality for purchase flow and entitlements management 36. That is, an API may be required to allow determination by the interactive extras package as to whether a content item has been purchased or rented as associated with a user account. In this way, access to the interactive extras may be controlled as described in greater detail below.

For the native API, a set of functions 46 may be required pertaining to provision of a player required to play content for authenticated users, and a set of functions 48 may further be required pertaining to sharing with social networks, e.g., posting on the same. A set of functions 44 may be required pertaining to a file system and management of the same. Other responsibilities of the media sharing server, and for which proper APIs may be provided, may pertain to maintaining wishlists, downloading the interactive extras package, and resuming playback in a native UI following termination of use of interactive extras application, and/or relinquishment of control from the interactive extras application back to the native media sharing application.

Certain exemplary APIs which may be provided by the content source 12 as part of the interactive extras package are described below and may be implemented in, e.g., JavaScript. The same are described with respect to FIGS. 6-12. Not all APIs are needed in every implementation, and delete additional APIs may be employed where dictated by the implementation.

Figure 3:
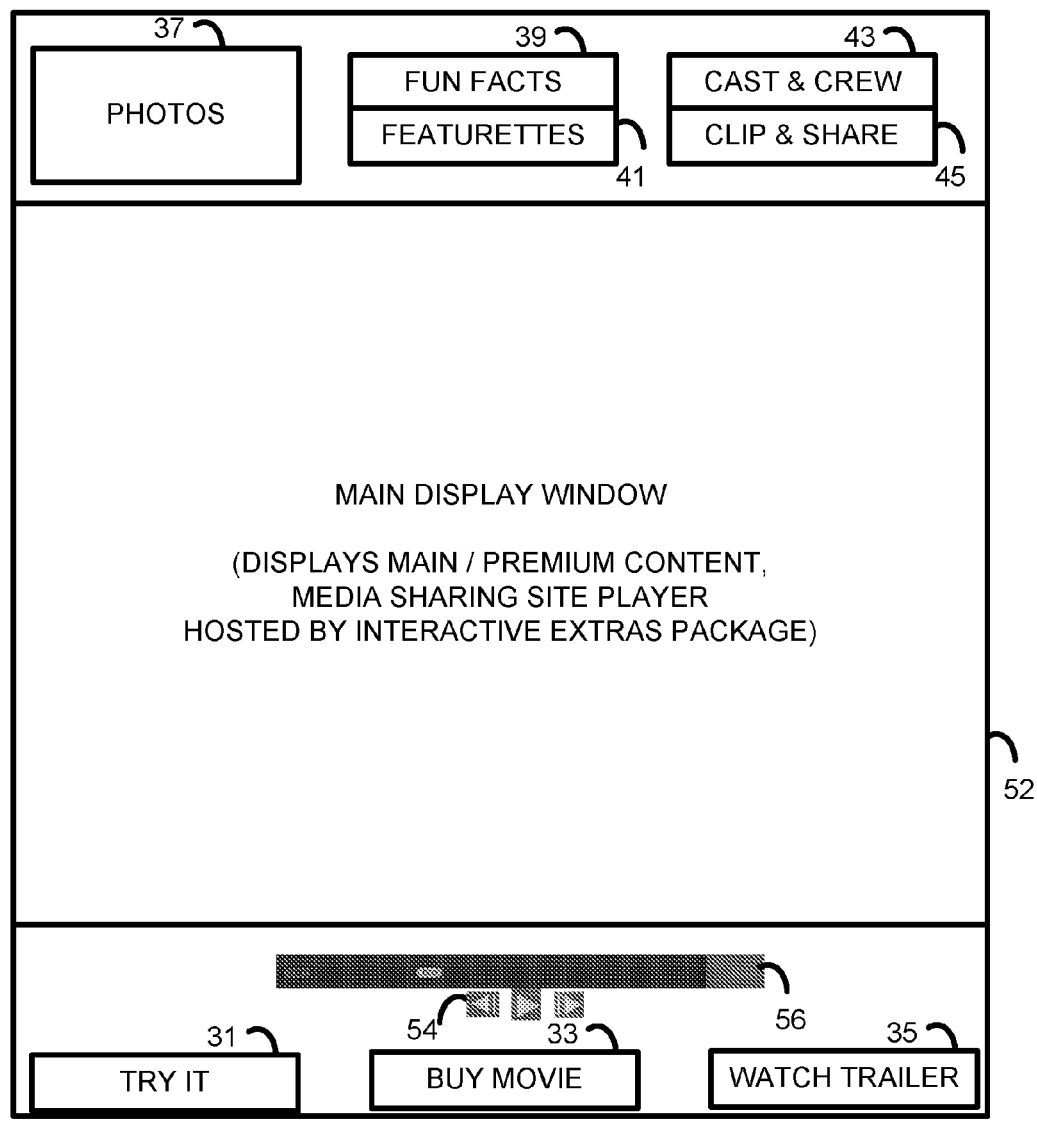
FIG. 3 is a schematic illustration of a user interface including activatable elements providing interactive extras.

FIG. 3 illustrates an exemplary UI 40 which may display the results of current apparatus and methods. Aspects of an exemplary API to implement the UI are noted in FIG. 9 by the functions listed. In FIG. 3, a main display window 52 is provided, which can display a main item of content, as well as content provided by the interactive extras. The main display window is provided by a player provided by the media sharing server and hosted by the interactive extras application via an API call (see also, e.g., exemplary player methods described in FIG. 6). Typical functionality may be provided within the UI 40, including a playhead 56 and controls for playback 54. The UI 40 may provide for functionality such that the user can try a sample of the main content item, using button 31. The user may be enabled to purchase the main content item, e.g., via a button 33. The user may be enabled to watch the trailer of the content item, e.g., via a button 35. To accomplish this potential purchase flow, as well as to manage entitlements in general, so as to determine what interactive extras may be accessed by the user, an API may be provided including one or more exemplary methods and callbacks shown in FIG. 11.

Returning to the discussion of FIG. 3, above the main display window 52 are illustrated a number of interactive extras. More or less interactive extras may be provided in any given implementation. In the figure, certain in-feature interactive extras are provided, including photos 37, e.g., from the main item of content, its filming history, marketing photos, and the like. An interactive extra 39 is provided for "fun facts", which when activated provides the user various trivia about the main content item, including in some cases an interactive quiz. Featurettes 41 may be provided as an interactive extra, the same corresponding to, e.g., related videos, deleted scenes, bonus scenes, or the like. Details about cast and crew may be provided by activation of an element 43, and the same may lead to individual pages about the cast and crew, links to other online resources, or the like. A "clip and share" button 45 is provided to allow a user to create their own clips from the movie, and to share the same, as well as to share predefined clips. Additional details about clip and share functionality are described in U.S. patent application Ser. No. 13/227,795, filed Sep. 8, 2011, entitled "System And Method For Providing Video Clips, And The Creation Thereof," owned by the assignee of the present application and herein incorporated by reference in its entirety.

Exemplary other interactive features may include access to a filmography. Yet other features may include access to a search functionality, where users may search dialogue of the main content item, cast information, trivia data, and the like. Yet other interactive features may include integration with and access to social networking sites, such that users can post comments about the content item, clips of the content item, and the like. For this interactive feature the interactive extras application may access one of the set of native APIs 42 within the media sharing site 16, and in particular a social networking API 48. A list of exemplary social networking methods is shown in FIG. 12.

Certain interactive features may be keyed to a timecode. For example, trivia about an actor in a scene, or trivia about how a scene was made, may be caused to appear as a UI element, e.g., separately from the main display window or overlaid thereon. Such data is generally keyed to the timecode of the scene, and thus knowledge of the timecode allows portrayal of the correct UI element at the appropriate time. Another example is a dialogue search, where if a desired line of dialogue is found in the search, an interactive feature allows skipping to the corresponding scene of the content item, again dependent on timecode. Other interactive features do not depend on timecode, e.g., certain trivia quizzes, deleted scenes, and the like. However, in some implementations, even these may be dependent on timecode, e.g., if the trivia is about a particular scene, or if the interactive extra indicates where within the playback of the content item the deleted scene would have occurred.

Referring next to the flowchart 50 of FIG. 4, a general workflow or method is described for use of an interactive extras package. In a first step, a media sharing server has initial control over interactions with the user, the user employing a user computing device in signal communication with the media sharing server (step 62). On a user interface of the user computing device, the user may then select an "interactive extras" activatable element (step 64). For example, while the user is viewing a content item in a player of the media sharing site, an activatable element may be provided to access interactive extras.

Upon selection of such an activatable element, the media sharing server launches an interactive extras application (step 66). As noted, in some implementations the interactive extras application may only serve to provide additional functionality as dictated by the API. In other cases, the application may be more complex. In any case, certain functions are then given control, from a native media sharing application, to the interactive extras application, via the API. For example, the interactive extras application may be given control of the player functionality. As another example, the interactive extras application may call the media sharing site's login API to authenticate the user, if such authentication has not already occurred. In some cases, the user's login state may simply be passed to the interactive extras application for the same purpose.

The interactive extras application may further call the media sharing sites locker API, or a similar API, to determine user entitlements (step 72). In this way the interactive extras application determines what access a user may be given to interactive extras associated with the main content item. Details will vary based on implementation, but it is noted that in many cases interactive extras may operate in a "preview" mode for main content items not owned by the user. In some cases, interactive extras may be provided by degrees, and may depend on the type of main content item owned by the user. For example, a first level of interactive extras may be provided upon purchase of a standard definition version of a movie, while a second level of interactive extras may be provided upon purchase of an HD version. Still more extras may be provided upon purchase of even more enhanced versions.

Through the interactive extras application, a user may play, share, and/or download the purchased or rented main content item (step 74). The purchase or rental of the content item may be by the interactive extras application accessing the media sharing site's "buy" functionality, e.g., via an API call (step 82). See again, e.g., the methods shown in FIG. 11. If the user plays the main content item, the same may be by way of the interactive extras application hosting the media sharing site's player component, again via an API call (step 78). See also the exemplary player methods shown in FIG. 6, as well as the exemplary downloading functions shown by file system methods and callbacks shown in FIG. 8. Exemplary event methods employable during playback include those shown in FIG. 7.

The user generally gains access to the appropriate interactive extras available upon their purchase of the main content item. These interactive extras may also be played, shared, and/or downloaded, depending on their mode of interaction. That is, through the interactive extras application, the user may activate one or more interactive extras (step 76) described above. Specific exemplary methods, callbacks, and data settings are shown in FIG. 10 for such interactive extras.

The user may continue to access the media sharing site/server through the interactive extras application/package, although in some cases the user may terminate access through the interactive extras, and return to the native UI of the media sharing site. If the user decides to terminate the interactive extras application (step 77), then control over the certain functionality provided in step 66 is relinquished, and the media sharing site's native application is given control once again over all functionality provided by its native UI. The system returns to the state of step 62.

Figure 5A:
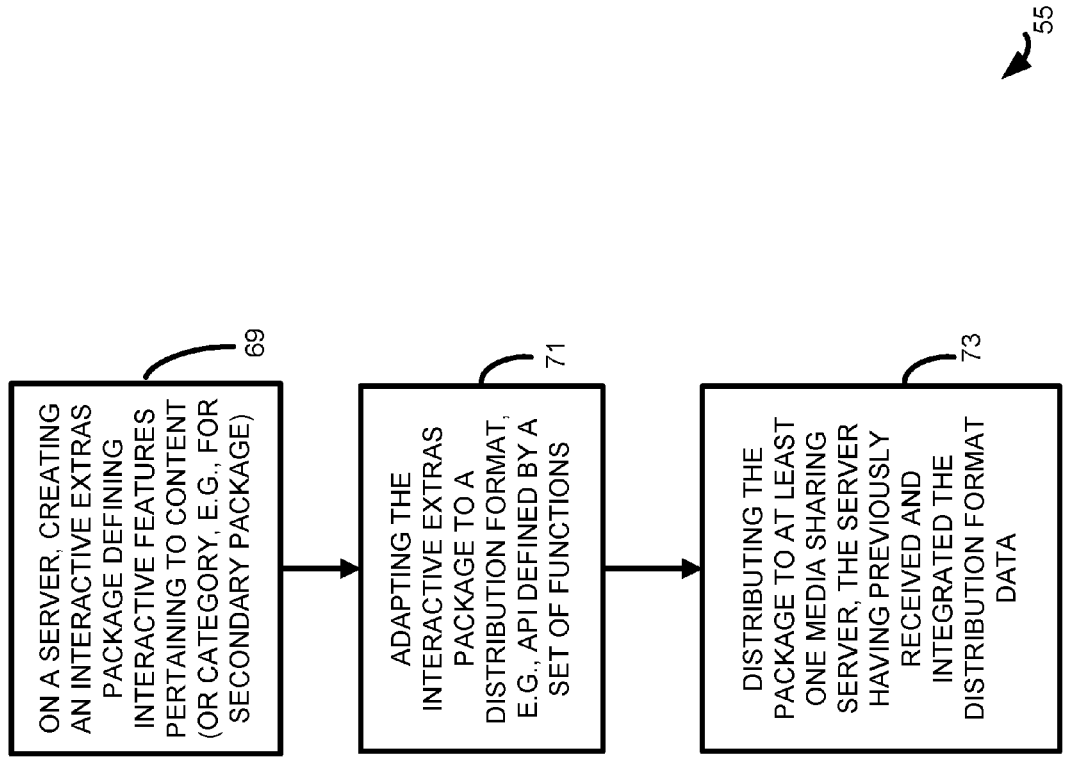
FIG. 5A is a flowchart illustrating a second method according to present principles.

FIG. 5A illustrates another flowchart 55 describing a method of making an interactive extras package performing one or more of the methods described above. In a first step, on a server, an interactive extras package defining one or more interactive features is created (step 69). That is, the interactive extras themselves are created and bundled as a package.

The interactive extras may pertain to a particular content item, or may pertain to a genre of content items. For example, a "horror genre" interactive package may be created, which may be provided to media sharing sites for distribution separately or along with distribution of horror movies. Generally, besides the genre, any such categorization may be used as the basis for such a "secondary package". Secondary packages provide additional layers of modularity, reusability, and customization. For example, different secondary packages may be chosen automatically for different distributors or users, such as selecting trailer packages based on region or date. Secondary packages may also be employed as a way to update an original interactive extras package, e.g., by using the secondary package to provide the update functionality. Secondary packages may in some implementations use the same API, or an additional common API, to interact with the media sharing site or with an original interactive extras package (or other secondary package). In one implementation, a content provider may give a media sharing site access to an interactive extras package but access to a secondary extras package is provided through the original interactive extras package and is thus transparent to the media sharing site. In yet another variation, parts of an original interactive extras package may be replaced by parts of a secondary extras package, including scenes, dialogue, or an audio track. Distributors may also access or provide one or more additional extras packages that are not provided by the original content provider's interactive extras package. For example a distributor may create its own extras package or may provide access to a third-party extras package, e.g., from an advertiser. Similar to the secondary packages above, these packages can also operate beside her with one another and/or the content provider's package(s).

The interactive extras package so created is then adapted to a particular distribution format (step 71). For example, the interactive extras package may be configured to conform to a defined structure and API. The package may then be distributed to at least one media sharing site, e.g., a media sharing server hosting a media sharing site (step 73). The media sharing site/server may have previously received and integrated into their UI data corresponding to the distribution format. That is, the media sharing site has generally performed an integration of their site by conforming to the API defined for the interactive extras package. In this way, as noted, the content provider can provide the same package of extras to multiple distributors that may have incompatible platforms without having to build custom packages for each platform. The incompatibility of the platforms will of been taken account of by the integration/conformation to the defined API. This allows the content provider to build the package once for all, and further provides a more consistent experience across various distributor services.

Figure 5B:
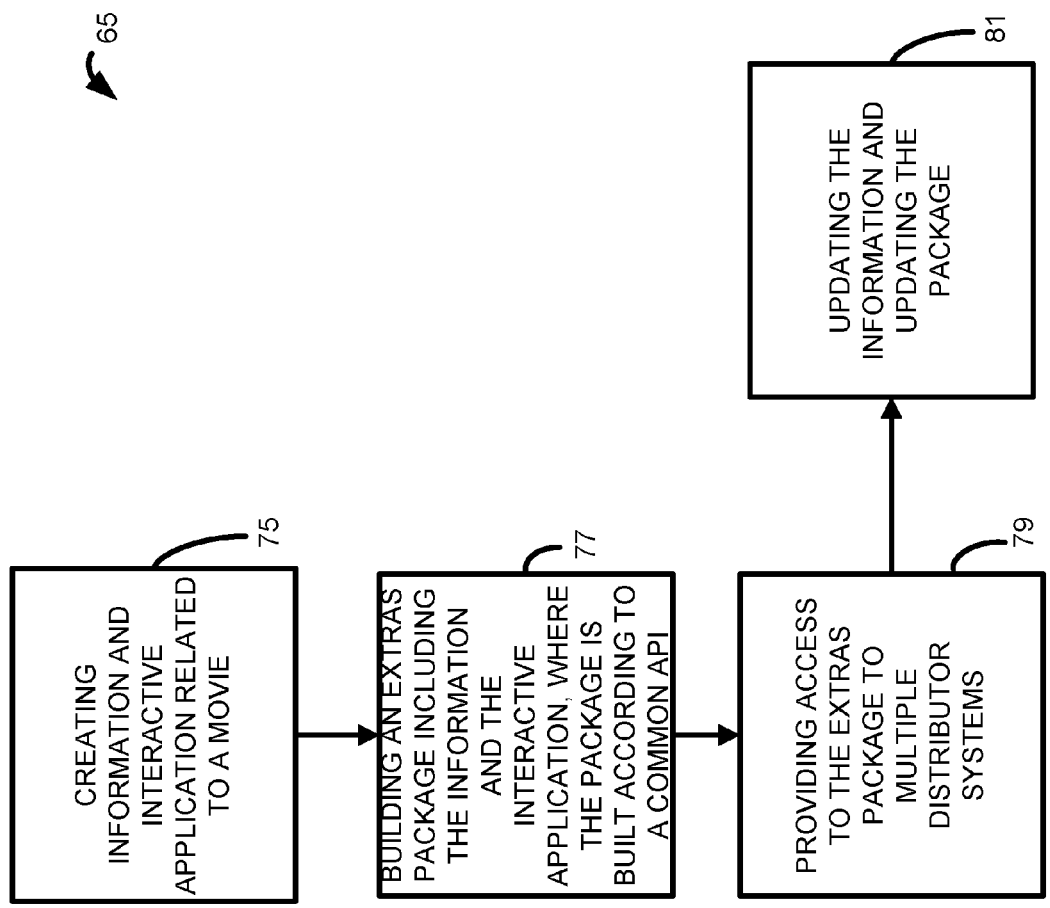
FIG. 5B is a flowchart illustrating a third method according to present principles.

FIG. 5B is another flowchart 65 of a method of creating and using an interactive extras package. In a first step, information and an interactive application are created related to a content item, e.g., a movie (step 75). An interactive extras package is then built, including the information and the interactive application (step 77). The package is built according to a common API. Access to the interactive extras package is then provided to multiple distributor systems (step 79). As above, the distributors systems have previously integrated with the API, and thus when the extras package for a particular content item is received, the same may be conveniently provided within the distributor system without significant further modification. In some cases, the information, interactive application, or the like, may be updated, and the update sent to the multiple distributors systems (step 81). Updates to the API will also be understood FIGS. 6-12 provide lists of various exemplary methods and callbacks pertaining to the API. Variations will be understood, and more or less functions may be provided within the API in any given implementation.

In one exemplary implementation, an interactive extras package may be built using HTML5 over a backbone JavaScript MVC framework. Other technologies employed may include CSS3, JQuery, and a JavaScript database to store and retrieve interactive content in JSON. Media sharing sites may employ various technologies as well, including the above, as well as, e.g., Google Web toolkit for development, Strobe Flash Player, and/or Open Source Media Framework (OSMF)-based media player.

What has been described is an apparatus and methods for providing an interactive extras package usable across multiple distributor platforms. Additional variations and implementations are also possible. For example, extras packages can be built for movies, television programs, advertising, web content, music, presentations, educational content, games, etc. Extras packages can include text, images, video, audio, music, links to network resources, interactive content, games, licenses, rights management information and software, promotional content or access rights (codes), etc. Interactive extras may include links to shopping sites, e.g., where users may purchase items they see within a main content item. Content corresponding to interactive extras packages may be hosted at, e.g., the content source or at the media sharing server. A benefit of the former is that updates to the package are implemented once and are then automatically applied across the multiple distributor platforms. A benefit of the latter is that the media sharing site retains greater control over the presentation of the content and interactive extras. Generally, the source of the premium or main item of content need not change, and the same is in many cases provided by a content delivery network. While the apparatus and methods have been described in the context of online access to a media sharing site, an interactive extras application may also run on a standalone computer environment, without online access. However, in such cases, both the main item of content and the interactive extras package would be downloaded onto the standalone computer environment, and/or accessible thereto, e.g., via a local network. Systems and methods according to present principles may be provided across numerous platforms, as listed below. Accordingly, the invention is not limited to the specific examples and implementations described here.

One implementation includes one or more programmable processors and corresponding computer system components to store and execute computer instructions, such as to provide the access and providing of information in the extras packages and the execution and interaction with interactive features of the extras. One such computing environment is disclosed below.

Figure 13:
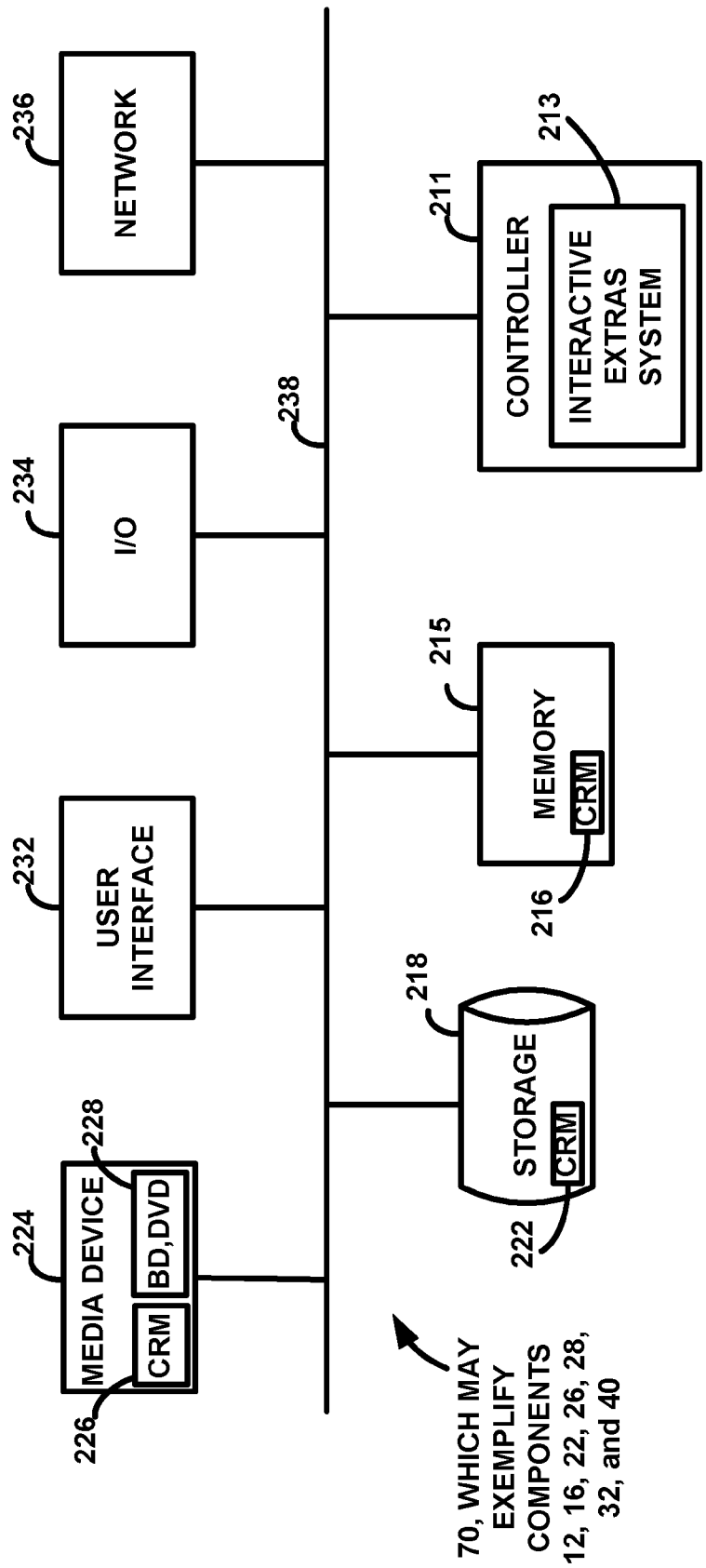
FIG. 13 illustrates an exemplary schematic computing environment which may be employed as certain of the components described.

Referring to FIG. 13, a representation of an exemplary computing environment 70 is illustrated as an example of how one or more systems according to present principles may be implemented. These systems may include, e.g., components indicated herein by reference numerals 12, 16, 22, 26, 28, 32, and 40. Generally, the creation and use of interactive extras packages and applications, as well as the playback of content items, require the use of such computing environments to perform the methods of the flowcharts described, e.g., flowcharts 4-5B.

The computing environment 80 includes a controller 211, a memory 215, storage 218, a media device 224, a user interface 232, an input/output (I/O) interface 234, and a network interface 236. The components are interconnected by a common bus 238. Alternatively, different connection configurations can be used, such as a star pattern with the controller at the center.

The controller 211 includes a programmable processor and controls the operation of the controller 213. The controller 211 loads instructions from the memory 215 or an embedded controller memory (not shown) and executes these instructions to control the system.

Memory 215, which may include non-transitory computer-readable memory 216, stores data temporarily for use by the other components of the system. In one implementation, the memory 214 is implemented as DRAM. In other implementations, the memory 214 also includes long-term or permanent memory, such as flash memory and/or ROM.

Storage 218, which may include non-transitory computer-readable memory 222, stores data temporarily or long-term for use by other components of the system, such as for storing data or instructions. In one implementation, the storage 218 is a hard disc drive, a solid state drive, or cloud storage.

The media device 224, which may include non-transitory computer-readable memory 226, receives removable media and reads and/or writes data to the inserted media. In one implementation, the media device 224 is an optical disc drive or disc burner, e.g., a writable Blu-ray® disc drive 228.

The user interface 232 includes components for accepting user input, e.g., the user creation and operation of interactive extras packages. The controller 211 uses inputs entered by the user to adjust the operation of the computing environment.

The I/O interface 234 includes one or more I/O ports to connect to corresponding I/O devices, such as external storage or supplemental devices. In one implementation, the ports of the I/O interface 234 include ports such as: USB ports, PCMCIA ports, serial ports, and/or parallel ports. In another implementation, the I/O interface 234 includes a wireless interface for wireless communication with external devices.

The network interface 236 allows connections with the local network and includes a wired and/or wireless network connection, such as an RJ-45 or Ethernet connection or Wi-Fi interface (802.11). Numerous other types of network connections will be understood to be possible, including WiMax, 3G or 4G, 802.15 protocols, 802.16 protocols, satellite, Bluetooth®, or the like.

The system may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

The methods shown and described above may be implemented in one or more general, multi-purpose, or single-purpose processors. Unless specifically stated, the methods described herein are not constrained to a particular order or sequence. In addition, some of the described methods or elements thereof can occur or be performed concurrently.

Functions/components described herein as being computer programs are not limited to implementation by any specific embodiments of computer programs. Rather, such functions/components are processes that convey or transform data, and may generally be implemented by, or executed in, hardware, software, firmware, or any combination thereof.

It will be appreciated that particular configurations of the operating environment may include fewer, more, or different components or functions than those described. In addition, functional components of the operating environment may be implemented by one or more devices, which are co-located or remotely located, in a variety of ways.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be construed as preferred or advantageous over other implementations or aspects thereof.

The system and method may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, are loaded into random access memory. Inputs to the application, e.g., from the plurality of users or from any one user, may be by any number of appropriate computer input devices. For example, users may employ a keyboard, mouse, touchscreen, joystick, trackpad, other pointing device, or any other such computer input device to input data relevant to the calculations. Data may also be input by way of an inserted memory chip, hard drive, flash drives, flash memory, optical media, magnetic media, or any other type of file—storing medium. The outputs may be delivered to a user by way of a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., personal computers, desktop computers, laptop computers, notebook computers, net book computers, handheld computers, personal digital assistants, mobile phones, smart phones, tablet computers, smart TVs, and also on devices specifically designed for these purpose. In one implementation, a user of a smart phone or WiFi—connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method. In the above system where extras packages are contemplated, the plural inputs may allow plural users to input relevant data and control package configurations at the same time.

As it is understood that embodiments other than the specific embodiments described above may be devised without departing from the spirit and scope of the appended claims, it is intended that the scope of the subject matter herein will be governed by the following claims.

The invention claimed is:

1. A method for providing access to interactive extras pertaining to a content item, comprising:
   a. receiving a login request from a user computing environment to a media sharing application operating on a media sharing server;
   b. receiving authentication credentials at the media sharing server of a user from the user computing environment;
   c. upon successful authentication, allowing access to one or more content items according to a user account associated with the received authentication credentials, the allowing access including allowing access to a player component operated by the media sharing application for playback of the one or more content items;
   d. receiving a request from the user computing environment to access interactive extras pertaining to the one or more content items;
   e. providing partial control from the media sharing application to an interactive extras application, the partial control including control of at least the player component and control of an interactive extras feature;
   f. receiving a request to terminate access to the interactive extras; and
   g. receiving control at the media sharing application from the interactive extras application, including control over the player component.

2. The method of claim 1, wherein the providing partial control from the media sharing application to the interactive extras application includes providing a user interface to provide access to one or more features within the interactive extras application.

3. The method of claim 1, further comprising:
   a. receiving distribution format data; and
   b. adapting the media sharing application to the distribution format data,
   c. such that the interactive extras may be incorporated within the media sharing application as ancillary content to the one or more content items without further modifying the media sharing application.

4. The method of claim 3, wherein the distribution format data includes an API, and wherein the adapting includes integrating the API into the media sharing application.

5. The method of claim 1, further comprising receiving a request from the user computing environment to access secondary interactive extras pertaining to a category of the one or more content items, and downloading or accessing a secondary interactive extras package pertaining to the category requested.

6. The method of claim 5, wherein the category is a genre.

7. The method of claim 5, wherein the secondary interactive extras package modifies the interactive extras application.

8. The method of claim 1, wherein the interactive extras application includes a page having links to one or more interactive extras.

9. The method of claim 1, wherein the interactive extras application is an application allowing access to a set of functions within an API.

10. The method of claim 1, further comprising updating the interactive extras application.

11. The method of claim 1, wherein the interactive extras application includes a tool to share information with other users through a network.

12. The method of claim 1, wherein the interactive extras application includes a tool to search information related to the one or more content items.

13. A non-transitory computer readable medium, comprising instructions for causing a computing environment to perform the method of claim 1.

\* \* \* \* \*